US012774201B2

(12) United States Patent
Ohta et al.

(10) Patent No.: US 12,774,201 B2
(45) Date of Patent: Oct. 27, 2026

(54) TRANSPORT DEVICE AND TRANSPORT METHOD

(71) Applicant: SUMITOMO HEAVY INDUSTRIES, LTD., Tokyo (JP)

(72) Inventors: Kenichi Ohta, Tokyo (JP); Taizo Iwayaguchi, Osaka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 177 days.

(21) Appl. No.: 18/914,725

(22) Filed: Oct. 14, 2024

(65) Prior Publication Data

US 2025/0128929 A1 Apr. 24, 2025

(30) Foreign Application Priority Data

Oct. 18, 2023 (JP) ................................ 2023-179649

(51) Int. Cl.

| | |
|---|---|
| ***B66F 9/14*** | (2006.01) |
| ***B66F 9/075*** | (2006.01) |
| ***B66F 9/08*** | (2006.01) |
| ***B66F 9/12*** | (2006.01) |
| ***B66F 9/18*** | (2006.01) |
| ***B66F 11/00*** | (2006.01) |
| *F04B 37/08* | (2006.01) |
| *F04B 39/14* | (2006.01) |

(52) U.S. Cl.

CPC .......... *B66F 9/145* (2013.01); *B66F 9/07554* (2013.01); *B66F 9/082* (2013.01); *B66F 9/087* (2013.01); *B66F 9/122* (2013.01); *B66F 9/18* (2013.01); *B66F 11/00* (2013.01); *F04B 37/08* (2013.01); *F04B 39/14* (2013.01)

(58) Field of Classification Search

CPC ........ B66F 9/145; B66F 9/07554; B66F 9/06; B66F 9/082

USPC .......................................................... 414/787

See application file for complete search history.

(56) References Cited

U.S. PATENT DOCUMENTS

| | | | | |
|---|---|---|---|---|
| 11,885,321 | B2 * | 1/2024 | Yatsu | F04B 37/08 |
| 11,920,576 | B2 * | 3/2024 | Yatsu | F04B 49/065 |
| 2024/0376877 | A1 * | 11/2024 | Takahashi | F04B 37/085 |
| 2024/0392767 | A1 * | 11/2024 | Nakanishi | F04B 37/08 |

FOREIGN PATENT DOCUMENTS

| | | | |
|---|---|---|---|
| JP | 2008-074537 | A | 4/2008 |
| JP | 6488422 | B1 | 3/2019 |
| JP | 2022-083523 | A | 6/2022 |

* cited by examiner

*Primary Examiner* — Ahshik Kim

(74) *Attorney, Agent, or Firm* — Michael Best & Friedrich LLP

(57) ABSTRACT

A transport device for transporting a cryopump includes a bogie that includes a front wheel and a rear wheel, a mast that extends from a front side of the bogie in a height direction, a raising and lowering unit that is supported by the mast and that has a changeable height, a guide rail that extends forward from the raising and lowering unit, an arm that is supported by the guide rail and that is slidable in a front-rear direction, a cargo platform that is provided at a tip part of the arm and that holds the cryopump, and a counterweight that is provided on a rear side of the bogie.

9 Claims, 6 Drawing Sheets

TRANSPORT DEVICE AND TRANSPORT METHOD

CROSS-REFERENCE TO RELATED APPLICATIONS

This application claims priority to Japanese Patent Application No. 2023-179649, filed on Oct. 18, 2023, which is incorporated by reference herein in its entirety.

BACKGROUND

Technical Field

A certain embodiment of the present invention relates to a transport device and a transport method for transporting a cryopump.

Description of Related Art

A cryopump is used in a vacuum process device that requires a high vacuum and is used in order to provide a high vacuum in a vacuum chamber. An example of the vacuum process device is a semiconductor manufacturing device for processing a semiconductor wafer. For example, the cryopump is attached to a side wall or the like of a vacuum process chamber in which the semiconductor wafer is processed.

SUMMARY

According to one embodiment of the present invention, there is provided a transport device for transporting a cryopump. The transport device includes a bogie that includes a front wheel and a rear wheel, a mast that extends from a front side of the bogie in a height direction, a raising and lowering unit that is supported by the mast and that has a changeable height, a guide rail that extends forward from the raising and lowering unit, an arm that is supported by the guide rail and that is slidable in a front-rear direction, a cargo platform that is provided at a tip part of the arm and that holds the cryopump, and a counterweight that is provided on a rear side of the bogie.

According to another embodiment of the present invention, there is provided a transport method of a cryopump using the transport device of the one embodiment. The transport method includes a process of causing the cargo platform to hold the cryopump, a process of causing the bogie to move, a process of changing a height of the raising and lowering unit, a process of sliding the arm, and a process of removing the cryopump from the cargo platform.

DETAILED DESCRIPTION

Figure 1:
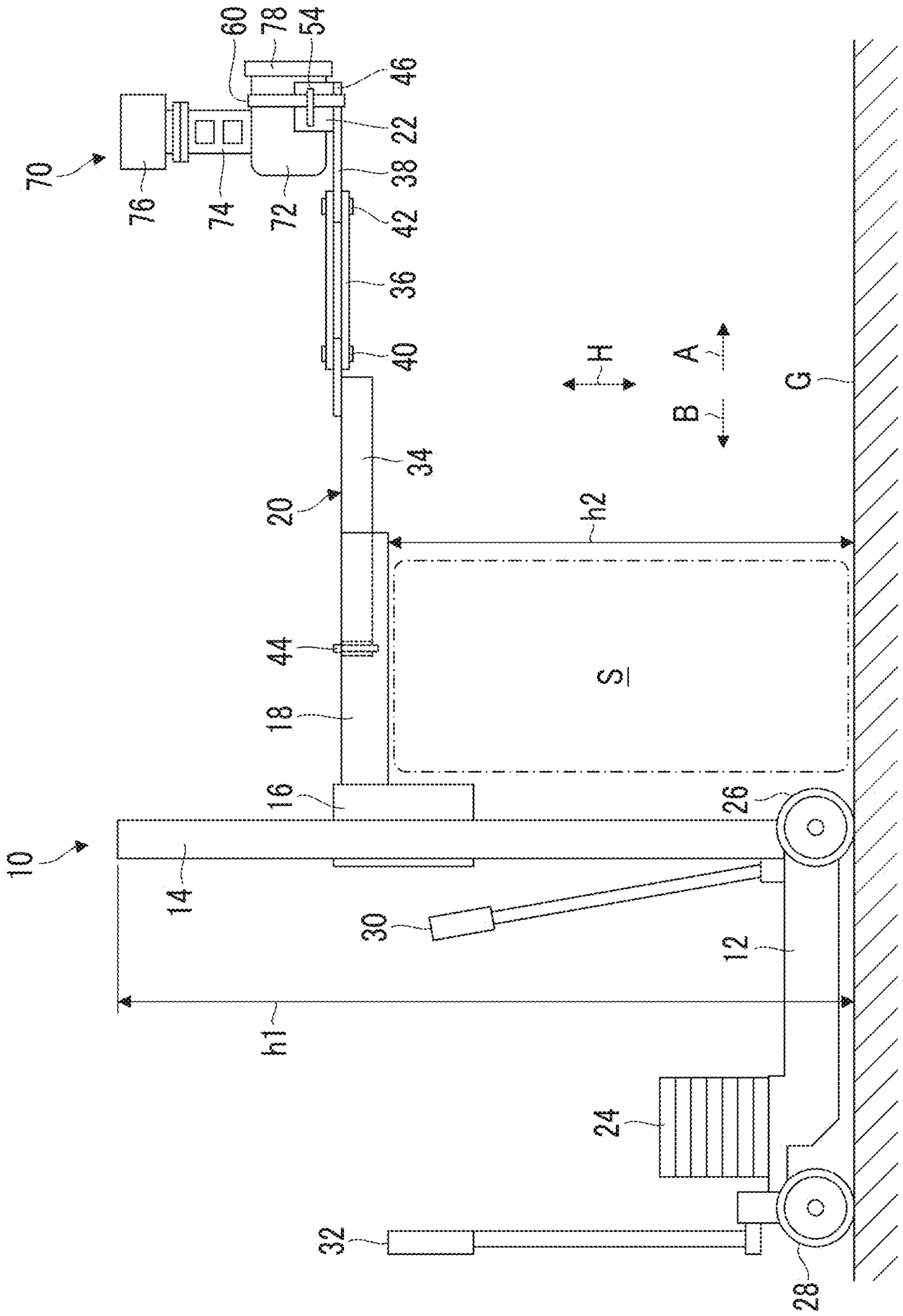
FIG. 1 is a side view schematically showing a configuration of a transport device according to an embodiment.

In recent years, the size of a semiconductor wafer has been increased, and a vacuum process chamber that accommodates the semiconductor wafer also tends to be increased in size. Various devices for processing the semiconductor wafer are disposed around the vacuum process chamber. Therefore, there is a limitation to a space where a cryopump can be installed, and the cryopump may be attached, for example, at a high position of an upper portion of the vacuum process chamber. In addition, a large cryopump having a higher exhaust performance is used in some cases as the vacuum process chamber increases in size. In a case where a large and heavy cryopump is installed at a high place, it is not easy to safely and efficiently perform work of attaching and detaching the cryopump for maintenance. For example, it takes effort to assemble a temporary scaffold or the like using a limited space around the vacuum process chamber. In addition, when a maintenance work time becomes long by assembling the scaffold or the like, a stop time of the semiconductor manufacturing device becomes long, which leads to a decrease in productivity.

It is desirable to provide a technique of safely and efficiently transporting a cryopump.

Any combination of the components described above and a combination obtained by switching the components and expressions of the present invention between methods, devices, and systems are also effective as an embodiment of the present invention.

According to the one embodiment of the present invention, the cryopump can be safely and efficiently transported.

Hereinafter, an embodiment for carrying out the present invention will be described in detail. Configurations to be described below are merely examples and do not limit the scope of the present invention. In addition, in the description of the drawings, the same elements will be assigned with the same reference signs, and redundant description will be omitted as appropriate. In addition, in the drawings referred to in the following description, sizes and thicknesses of the respective components are for convenience of description and do not necessarily indicate actual dimensions or proportions.

Figure 2:
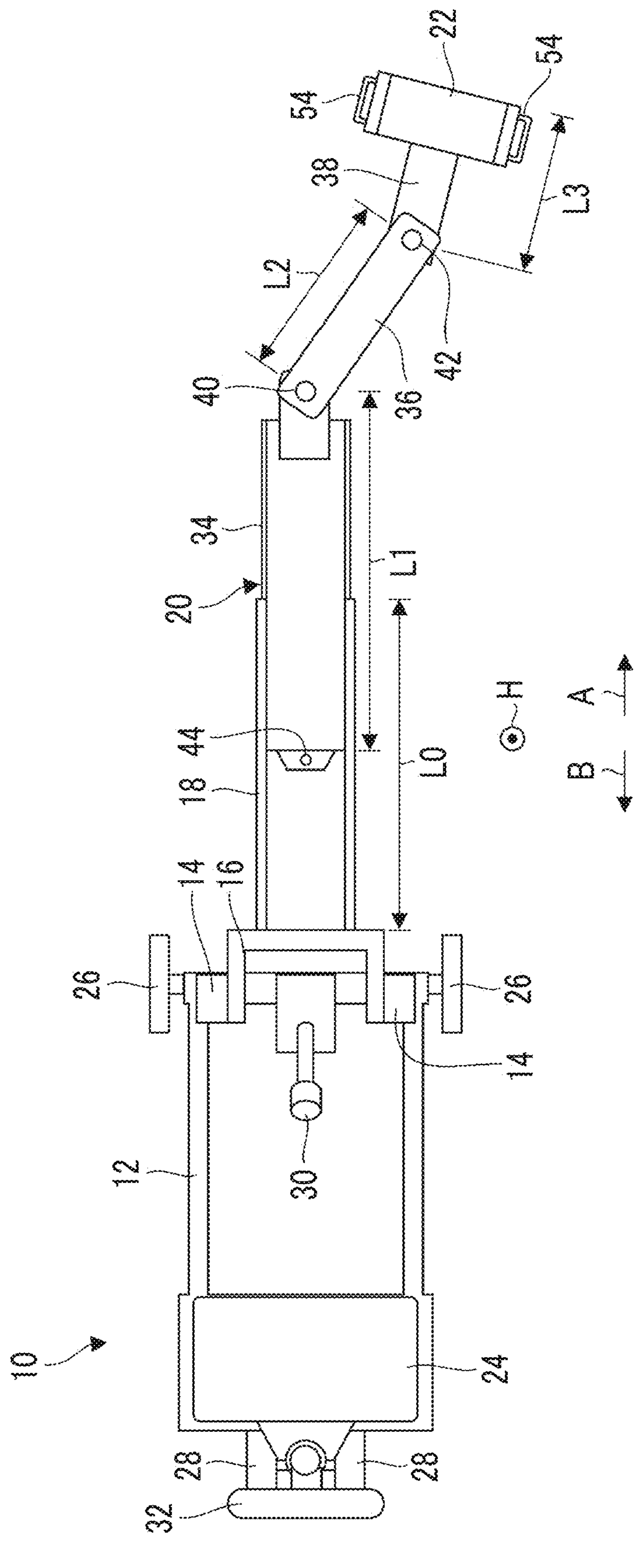
FIG. 2 is a top view schematically showing the configuration of the transport device according to the embodiment.

FIG. 1 is a side view schematically showing a configuration of a transport device 10 according to the embodiment. FIG. 2 is a top view schematically showing the configuration of the transport device 10 according to the embodiment. The transport device 10 is used in order to transport a cryopump 70 shown in FIG. 1. FIG. 2 shows a state where the cryopump 70 is removed.

The cryopump 70 includes a cryopanel container 72, a connection container 74, and a cryocooler 76. The cryopanel container 72 is a portion that accommodates a cryopanel which is cooled to a cryogenic temperature (for example, 10K to 20K) and is a portion that is attached to a vacuum process device via a flange 78. The cryopanel container 72 is a cylindrical vacuum chamber. The connection container 74 is a vacuum chamber that is provided at a side portion of the cryopanel container 72 and that connects the cryopanel container 72 and the cryocooler 76 to each other. The cryocooler 76 cools the cryopanel provided inside the cryopanel container 72 via the connection container 74.

The weight of the cryopump 70 also depends on a size and a performance, but is, for example, approximately 20 kg to 100 kg. Therefore, it is not preferable for a human to directly hold the cryopump 70 by hand to move, raise, and lower the cryopump 70 from a viewpoint of safety and efficiency.

The transport device 10 is a device for moving, raising, and lowering the cryopump 70, which is a heavy object, and is a so-called power lifter. For example, the transport device 10 is configured to hold the cryopanel container 72 of the cryopump 70. The transport device 10 includes a bogie 12, a mast 14, a raising and lowering unit 16, a guide rail 18, an arm 20, a cargo platform 22, and a counterweight 24.

The bogie 12 includes a front wheel 26 and a rear wheel 28 for traveling on ground G. In the present embodiment, a direction A from the rear wheel 28 toward the front wheel 26 will be referred to as the front, and a direction B from the front wheel 26 toward the rear wheel 28 will be referred to as the rear in some cases. A height direction H is a direction perpendicular to the ground G on which the bogie 12 travels.

The mast 14 is provided on a front side of the bogie 12. A raising and lowering handle 30 for moving the raising and lowering unit 16 along the mast 14 in the height direction His provided on the front side of the bogie 12. Herein, the front side of the bogie 12 refers to a position closer to the front wheel 26 than the rear wheel 28. When the raising and lowering handle 30 is manually operated, the height of the raising and lowering unit 16 can be adjusted.

A steering handle 32 for changing the direction of the rear wheel 28 is provided on a rear side of the bogie 12. By operating the steering handle 32 to cause the rear wheel 28 to travel, for example, the direction of the bogie 12 can be changed around the front wheel 26. The counterweight 24 is provided on the rear side of the bogie 12. The weight of the counterweight 24 is, for example, 200 kg or more and 1,000 kg or less and is, for example, 300 kg or more and 800 kg or less. The counterweight 24 is disposed between the front wheel 26 and the rear wheel 28 and is provided at a position close to the rear wheel 28 (that is, a position far from the front wheel 26). Herein, the rear side of the bogie 12 refers to a position closer to the rear wheel 28 than the front wheel 26.

The mast 14 is supported by the bogie 12 and extends in the height direction H from the bogie 12. As shown in FIG. 2, a pair of masts 14 disposed on the right and left of the bogie 12 can be provided. The mast 14 may be configured to be slidable in a front-rear direction with respect to the bogie 12. The mast 14 may be configured to be capable of adjusting the position in the front-rear direction between a front end (for example, the position of the front wheel 26) of the bogie 12 and the vicinity of the center of the bogie 12 and may be configured to be capable of fixing the position in the front-rear direction by a stopper (not shown). The height of the mast 14 (for example, a height h from the ground G) is, for example, 2 m or more and 3 m or less and is, for example, approximately 2.5 m.

The raising and lowering unit 16 is configured to be supported by the mast 14, to move in the height direction H along the mast 14, and to be capable of changing the height. The raising and lowering unit 16 is configured, for example, to be raised and lowered by a hydraulic pump (not shown) that operates by manually operating the raising and lowering handle 30. The raising and lowering unit 16 may be configured to be raised and lowered by an electric hydraulic pump or an electric motor.

The guide rail 18 is supported by the raising and lowering unit 16 and extends linearly forward from the raising and lowering unit 16. The guide rail 18 supports the arm 20 so that the arm 20 is slidable in the front-rear direction. A length L0 (see FIG. 2) of the guide rail 18 in the front-rear direction is, for example, 0.5 m or more and 1.5 m or less and is, for example, 0.7 m or more and 1.0 m or less. An end portion of the guide rail 18 is fixed to the raising and lowering unit 16. When the height of the raising and lowering unit 16 is changed, a height h0 of the guide rail 18 is also changed.

The guide rail 18, for example, the entire guide rail 18 can be positioned in front of the front wheel 26. As a result, there is a space S that can be freely used at a position between the ground G and the guide rail 18 and that has no structure which comes into contact with the ground G in order to support the transport device 10. A height h1 of the guide rail 18 can be adjusted in a range of, for example, 0.2 m or more and 2.5 m or less in accordance with the height of the raising and lowering unit 16.

The arm 20 is configured to be supported by the guide rail 18 and to be slidable in the front-rear direction along the guide rail 18. The arm 20 can be configured as a multi-joint arm. In the example shown in FIGS. 1 and 2, the arm 20 includes a first arm member 34, a second arm member 36, and a third arm member 38. The first arm member 34 and the second arm member 36 are pivotably connected to each other by a first joint 40. The second arm member 36 and the third arm member 38 are pivotably connected to each other by a second joint 42. The arm 20 may include two arm members or may include four or more arm members. The arm 20 may have a configuration without a joint.

The first arm member 34 is a portion supported by the guide rail 18. A length L1 of the first arm member 34 is, for example, 0.5 m or more and 1.5 m or less and is, for example, 0.7 m or more and 1.0 m or less. For example, the length L1 of the first arm member 34 is substantially the same as the length L0 of the guide rail 18. Accordingly, substantially the entire first arm member 34 can be accommodated inside the guide rail 18, and a distance from the raising and lowering unit 16 to a tip part (for example, the first joint 40) of the first arm member 34 can be made substantially the same as the length L0 of the guide rail 18. In addition, substantially the entire first arm member 34 can be extracted outside the guide rail 18, and a distance from the raising and lowering unit 16 to the tip part (for example, the first joint 40) of the first arm member 34 can be set to approximately twice the length L0 of the guide rail 18. The position of the first arm member 34 with respect to the guide rail 18 is configured to be fixed using a fixing pin 44.

The second arm member 36 is attached to the tip part of the first arm member 34. For example, a length L2 of the second arm member 36 is shorter than the length L1 of the first arm member 34. The length L2 of the second arm member 36 is, for example, 0.2 m or more and 1.0 m or less and is, for example, 0.3 m or more and 0.7 m or less. The second arm member 36 is configured to be attached to the first arm member 34 via the first joint 40 and to be pivotable with respect to the first arm member 34. The first joint 40 is configured to be pivotable around an axis extending in the height direction. Accordingly, the second arm member 36 is pivotable in a right-left direction with respect to the tip part of the first arm member 34.

The third arm member 38 is attached to a tip part of the second arm member 36. For example, a length L3 of the third arm member 38 is shorter than the length L2 of the second arm member 36. The length L3 of the third arm member 38 is, for example, 0.1 m or more and 0.7 m or less and is, for example, 0.2 m or more and 0.5 m or less. The third arm member 38 is configured to be attached to the second arm member 36 via the second joint 42 and to be pivotable with respect to the second arm member 36. The second joint 42 is configured to be pivotable around an axis extending in the height direction. Accordingly, the third arm member 38 is pivotable in the right-left direction with respect to the tip part of the second arm member 36.

The first joint 40 may include a sliding spacer that is disposed between the first arm member 34 and the second arm member 36 and that is for smoothly pivoting the second arm member 36 with respect to the first arm member 34. Similarly, the second joint 42 may include a sliding spacer that is disposed between the second arm member 36 and the third arm member 38 and that is for smoothly pivoting the third arm member 38 with respect to the second arm member 36. That is, the sliding spacer can be provided between the two arm members connected to each other by the joint. As the sliding spacer, for example, a resin spacer made of a fluororesin or the like can be used.

The cargo platform 22 is provided at a tip part 46 (for example, a tip part of the third arm member 38) of the arm 20 and is configured to hold the cryopump 70. For example, the cargo platform 22 is fixed to the tip part 46 not to pivot with respect to the tip part 46 of the arm 20. The cargo platform 22 may be attached to be pivotable with respect to the tip part 46 of the arm 20 via the joint or the like. The cargo platform 22 may be pivotable around an axis in the height direction H with respect to the tip part 46 of the arm 20 or may be pivotable around an axis in a horizontal direction (for example, the front-rear direction).

Figure 3:
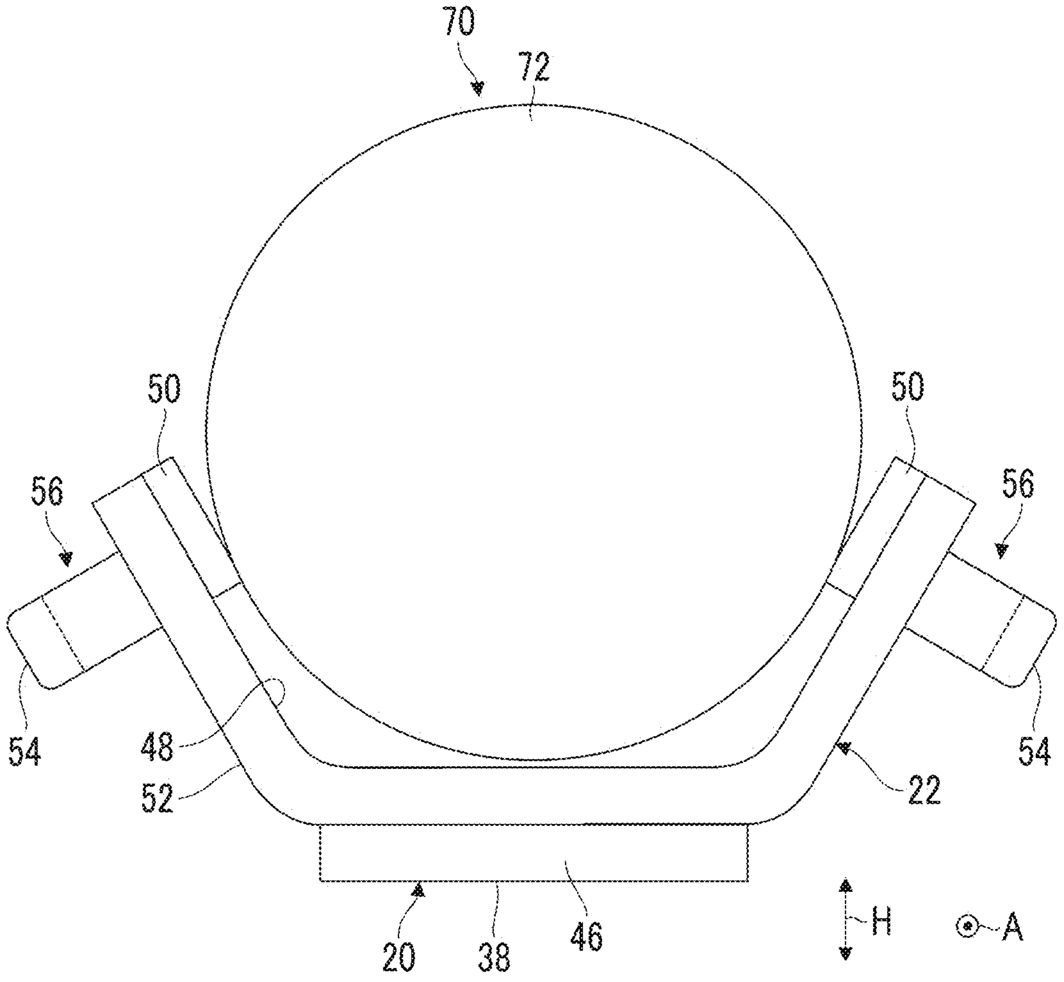
FIG. 3 is a front view schematically showing a configuration of a cargo platform.

FIG. 3 is a front view schematically showing a configuration of the cargo platform 22 and shows the configuration of the cargo platform 22 when viewed in a direction in which the tip part 46 of the arm 20 extends (front-rear direction). The cargo platform 22 includes an inner surface 48 having a recessed shape for receiving a side surface of the cylindrical cryopanel container 72. A protection member 50 can be provided at a location on the inner surface 48 of the cargo platform 22 that can come into contact with the cryopump 70. The protection member 50 is formed of, for example, a plate made of a resin such as a fluororesin.

A gripping handle 54 that is gripped by a user in order to adjust the position or the direction of the cargo platform 22 is provided on an outer surface 52 of the cargo platform 22. For example, a pair of gripping handles 54 disposed on the right and left of the cargo platform 22 can be provided. A through-hole 56 is present between the outer surface 52 of the cargo platform 22 and the gripping handle 54. For example, a fixing tool 60 (see FIG. 1) such as a fastening band for fixing the cryopump 70 to the cargo platform 22 can pass through the through-hole 56. In this case, the gripping handle 54 can function as a locking portion for locking the fixing tool 60. A cutout may be provided instead of the through-hole 56.

The transport device 10 may further include an outrigger (not shown) that can be extended to the side of the bogie 12. The outrigger can be provided to extend from the front (for example, a position near the front wheel 26) to the side of the bogie 12. The outrigger may be provided to extend from the mast 14 to the side. For example, the outrigger is configured to be accommodated when the bogie 12 travels and to be extended to come into contact with the ground G when the bogie 12 is stopped to operate the arm 20 and to support the bogie 12. The outrigger can reduce a risk of the transport device 10 falling in the right-left direction.

The transport device 10 can hold the cryopump 70 at a position separated forward from the bogie 12 and the mast 14 with the guide rail 18 and the arm 20 extending forward from the raising and lowering unit 16. A distance from the mast 14 to the cargo platform 22 is, for example, 1.5 m or more and 5 m or less and, for example, 2 m or more and 4 m or less in a state where the arm 20 is extracted to the maximum from the guide rail 18. The transport device 10 can adjust the position of the cargo platform 22 in the front-rear direction by sliding the arm 20 with respect to the guide rail 18. The transport device 10 can adjust the position of the cargo platform 22 in the right-left direction and the direction of the cargo platform 22 with respect to the guide rail 18 by pivoting the first joint 40 and the second joint 42. The transport device 10 can adjust a height position of the cargo platform 22 by changing the height of the raising and lowering unit 16.

Subsequently, a method of using the transport device 10 will be described. For example, the transport device 10 can be used in order to transport the cryopump 70 that is removed from the vacuum process device or that is attached to the vacuum process device. An example of the vacuum process device is an ion implanter for irradiating a semiconductor wafer with an ion beam.

Figure 4:
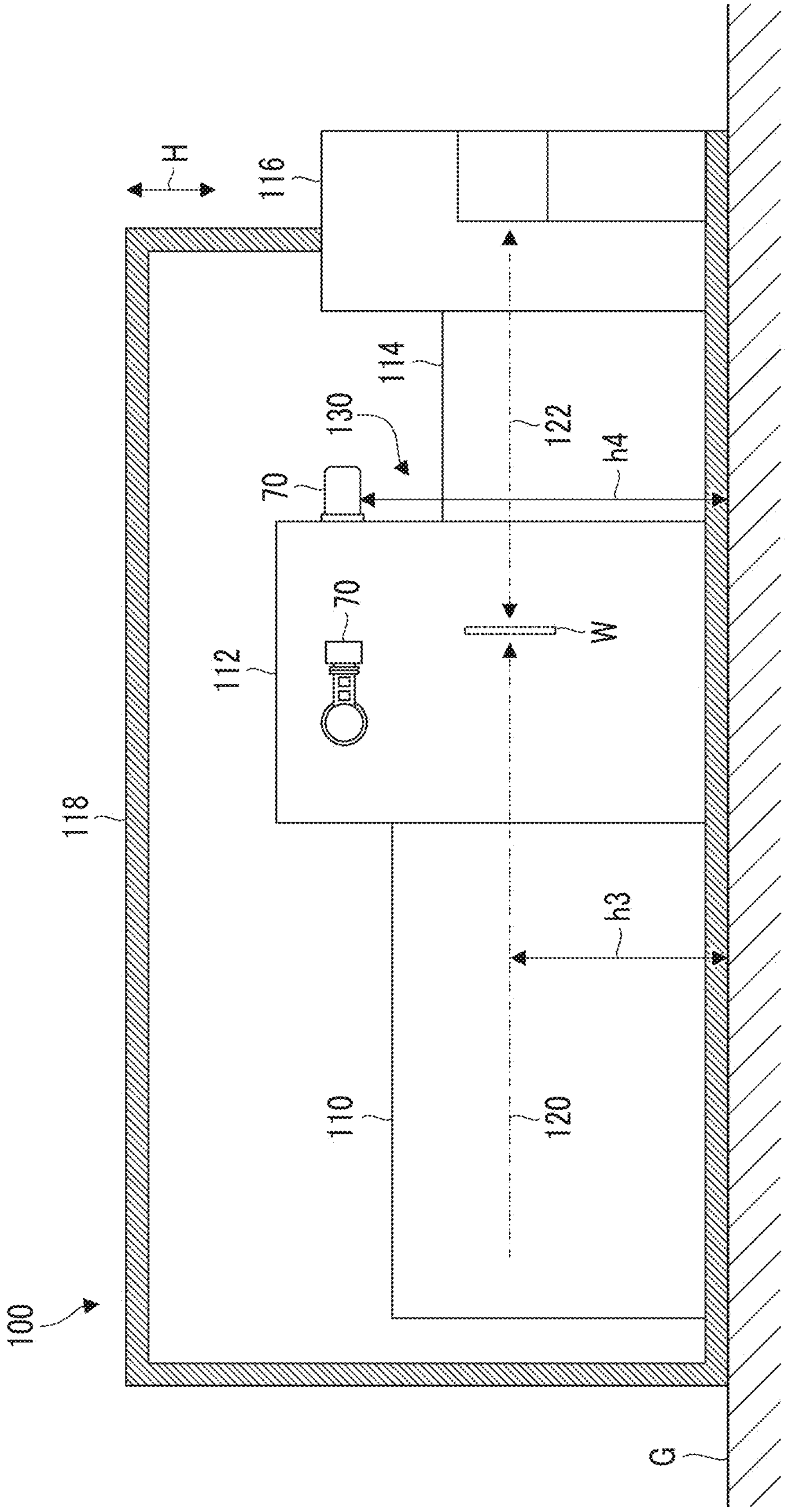
FIG. 4 is a side view schematically showing a configuration example of a vacuum process device.

FIG. 4 is a side view schematically showing a configuration example of a vacuum process device 100. The vacuum process device 100 shown in FIG. 4 is an ion implanter. The vacuum process device 100 includes an ion beam generation device 110, a vacuum process chamber 112, a wafer transport device 114, a load port 116, and an outer casing 118.

The ion beam generation device 110 generates an ion beam and transports the generated ion beam to the vacuum process chamber 112 along a beamline 120. The vacuum process chamber 112 is a vacuum chamber where a high vacuum is maintained, and ion implantation processing of irradiating a wafer W with the ion beam is performed inside the vacuum process chamber 112. The cryopump 70 is attached to a side wall of the vacuum process chamber 112. The wafer transport device 114 transports the wafer W between the vacuum process chamber 112 and the load port 116 along a transport line 122. The load port 116 receives a container (for example, a FOUP) for storing the wafer W. The outer casing 118 is provided at outer peripheries of the ion beam generation device 110, the vacuum process chamber 112, and the wafer transport device 114 and surrounds the ion beam generation device 110, the vacuum process chamber 112, and the wafer transport device 114. The outer casing 118 includes, for example, a radiation shielding material such as lead for shielding radiation generated near the beamline 120.

In the vacuum process device 100, a height h3 of the beamline 120 or the transport line 122 related to processing of the wafer W is often set to approximately 1 m to 1.5 m in consideration of convenience or the like of the user. In this case, various types of devices constituting the ion beam generation device 110 or the wafer transport device 114 adjacent to the vacuum process chamber 112 occupy a height position of approximately 1 m to 1.5 m. As a result, the cryopump 70 has almost no space at a height of approximately 1 m to 1.5 m, which is easy to work, and is often attached to an upper portion of the vacuum process chamber 112 having a relatively large space. A height h4 at which the cryopump 70 is installed is, for example, approximately 2 m to 2.5 m. The transport device 10 is useful for transporting the cryopump 70 installed at such a high place.

Figure 5:
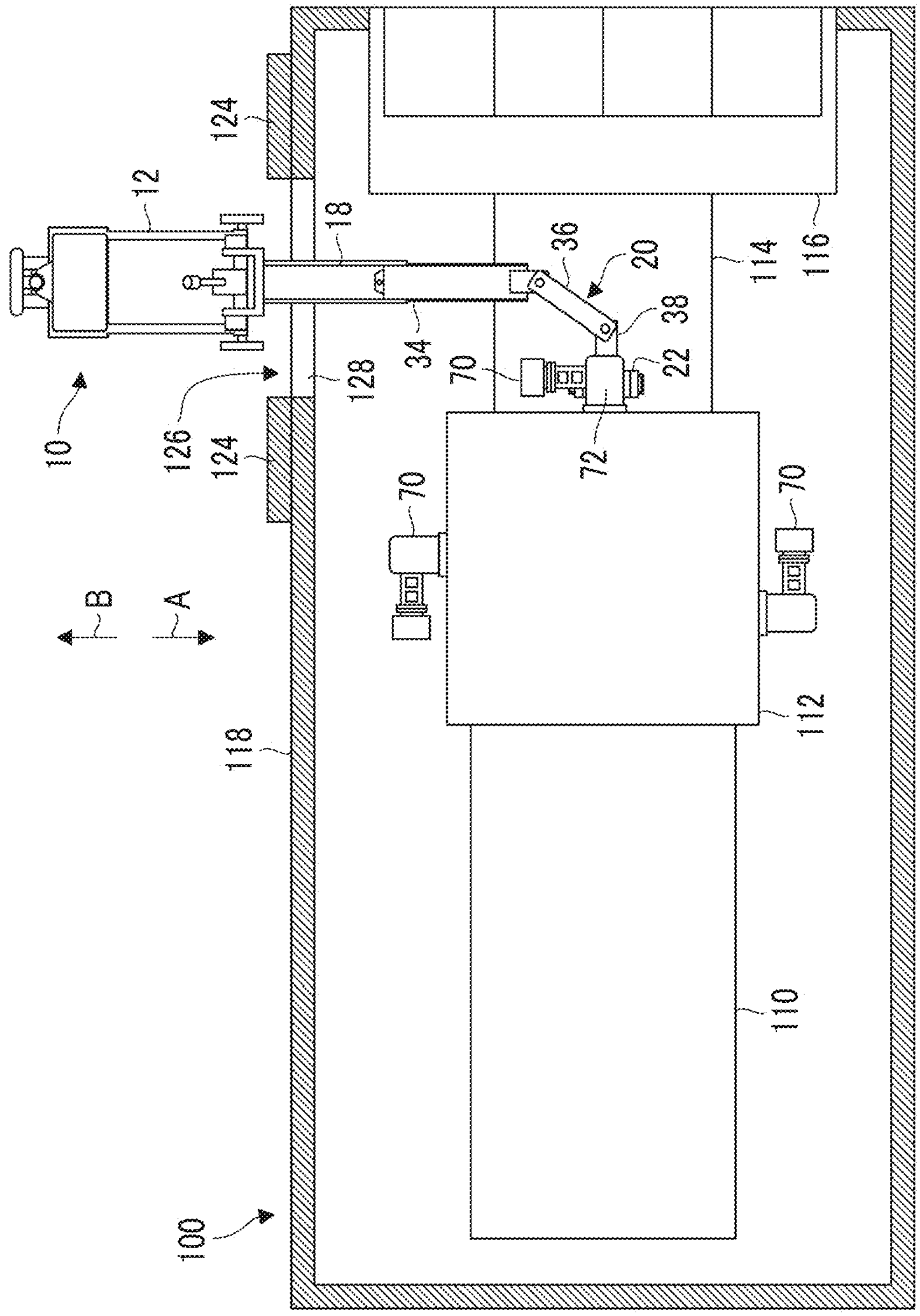
FIG. 5 is a top view schematically showing a process of attaching and detaching a cryopump of a vacuum process chamber.

FIG. 5 is a top view schematically showing a process of attaching and detaching the cryopump 70 in the vacuum process chamber 112, and the vacuum process device 100 shown in FIG. 4 is viewed from above. First, a door 124 that constitutes a part of the outer casing 118 is opened to secure a work port 126 for entering the inside of the outer casing 118. Next, the transport device 10 is moved close to the work port 126, and the arm 20 and the guide rail 18 are inserted into the outer casing 118 through the work port 126. Since a rail 128 for supporting the door 124 is present at the foot of the work port 126, it is difficult to allow the bogie 12 to enter the inside of the outer casing 118. Subsequently, the position and the direction of the arm 20 are adjusted, and the cargo platform 22 is disposed immediately below the cryopump 70 (for example, the cryopanel container 72).

In the example shown in FIG. 5, the cryopump 70 immediately above the wafer transport device 114 is to be removed. As shown in FIG. 4, a space 130 between the wafer transport device 114 and the cryopump 70 may be narrow, and for example, only a gap of 1 m or less or 0.5 m or less may be present. In addition, since the wafer transport device 114 is present immediately below the cryopump 70, it is difficult to assemble a scaffold immediately below the cryopump 70. The cargo platform 22 can be disposed in such a limited space 130 by using the transport device 10, adjusting the height of the raising and lowering unit 16, and sliding and extending the arm 20 from the guide rail 18. Since there is the space S (see FIG. 1) that can be freely used below the guide rail 18, the bogie 12 can be brought close to the work port 126, and the cargo platform 22 can be inserted up to a position separated from the work port 126.

Next, the cryopump 70 is removed from the vacuum process chamber 112, and the removed cryopump 70 is held by the cargo platform 22. The cryopump 70 can be firmly fixed to the cargo platform 22 using, for example, the fixing tool 60 such as a fastening band. Before the cryopump 70 is removed from the vacuum process chamber 112, the cryopump 70 may be fixed to the cargo platform 22. In this case, the cryopump 70 can be removed from the vacuum process chamber 112 in a state where the cryopump 70 is fixed to the cargo platform 22.

Next, the cryopump 70 can be transported inside the outer casing 118 by adjusting the position or the direction of the arm 20. For example, the arm 20 is accommodated inside the guide rail 18, so that the cargo platform 22 can be brought close to the bogie 12. After then, the bogie 12 is caused to travel rearward, so that the arm 20 can be extracted through the work port 126, and the cryopump 70 can be carried out to the outside of the outer casing 118. By lowering the height of the raising and lowering unit 16 outside the outer casing 118, the height of the cargo platform 22 can be lowered, and the cryopump 70 can be safely removed from the cargo platform 22.

In a case where the cryopump 70 is attached to the vacuum process chamber 112, procedures opposite to work of removing the cryopump 70 described above can be used. The cryopump 70 is held by the cargo platform 22 on the outside the outer casing 118, the cryopump 70 is transported to the inside of the outer casing 118 using the transport device 10, the cryopump 70 is removed from the cargo platform 22, and the cryopump 70 can be attached to the vacuum process chamber 112.

Figure 6:
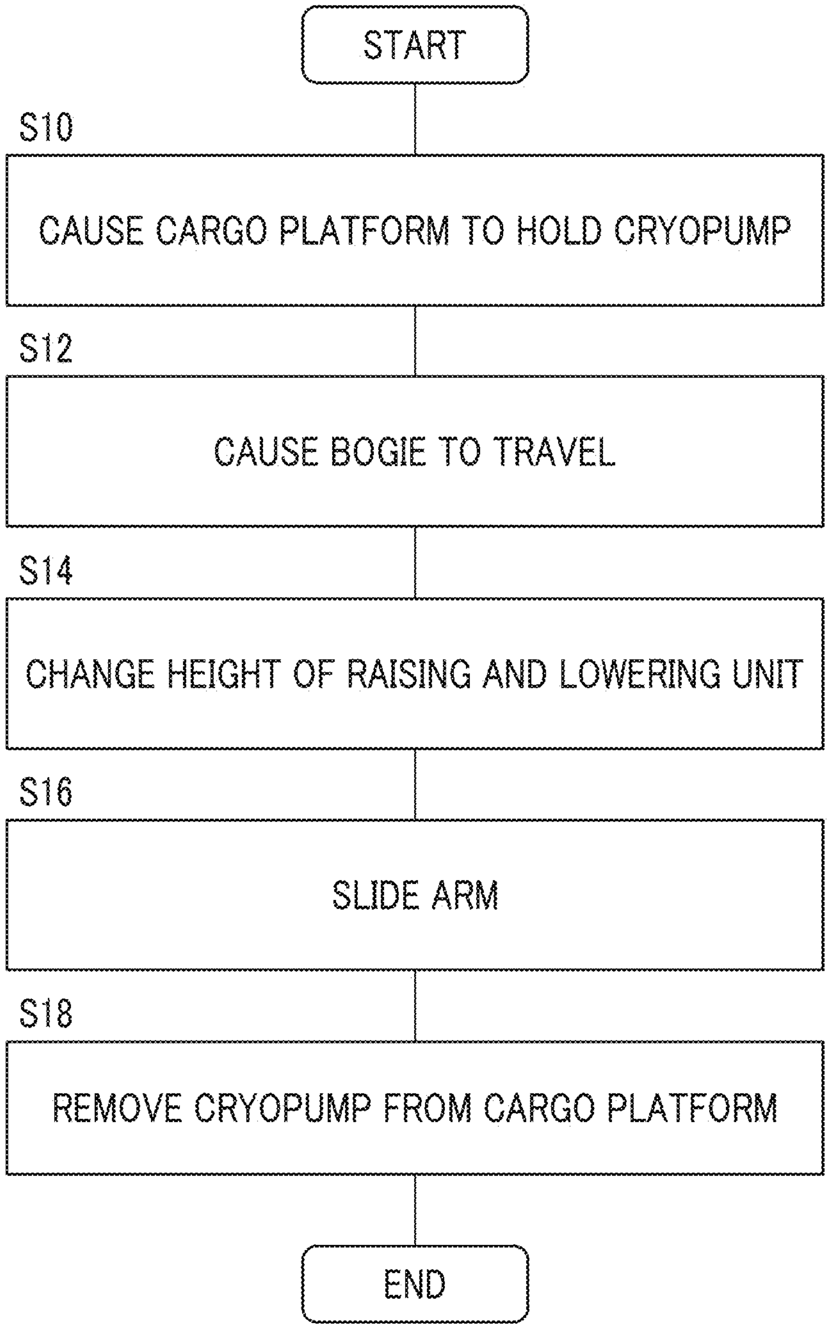
FIG. 6 is a flowchart showing an example of a transport method according to the embodiment.

FIG. 6 is a flowchart showing an example of a transport method according to the embodiment. The transport method using the transport device 10 includes a process (S10) of causing the cargo platform 22 to hold the cryopump 70, a process (S12) of causing the bogie 12 to travel, a process (S14) of changing the height of the raising and lowering unit 16, a process (S16) of sliding the arm 20, and a process (S18) of removing the cryopump 70 from the cargo platform 22. The order of the traveling process (S12), the height change process (S14), and the sliding process (S16) is not particularly limited, and these processes may be performed in different order, or these processes may be performed a plurality of times in any order.

The transport method may further include, in a case where the arm 20 is a multi-joint arm, a process of pivoting a joint (for example, the first joint 40 or the second joint 42) to adjust the position or the direction of the cargo platform 22. The process of pivoting the joint can also be performed at any timing and any number of times between the process of S10 and the process of S18.

In the embodiment described above, a case where the transport device 10 is used for the purpose of transporting the cryopump 70 provided at the vacuum process chamber, which is the ion implanter, has been described. The transport device 10 may be used in transporting the cryopump provided at a location other than the vacuum process chamber or may be used in transporting the cryopump provided at the ion beam generation device 110 or the wafer transport device 114. The transport device 10 may be used in transporting the cryopump provided at any vacuum process device other than the ion implanter. The transport device 10 may be used in order to transport any device other than the cryopump or may be used in order to transport any device that constitutes the vacuum process device.

The present invention has been described hereinbefore based on the examples. It is clear for those skilled in the art that the present invention is not limited to the embodiment, various design changes are possible, various modification examples are possible, and such modification examples are also within the scope of the present invention.

It should be understood that the invention is not limited to the above-described embodiment, but may be modified into various forms on the basis of the spirit of the invention. Additionally, the modifications are included in the scope of the invention.

What is claimed is:

1. A transport device for transporting a cryopump, the transport device comprising:
- a bogie that includes a front wheel and a rear wheel;
- a mast that extends from a front side of the bogie in a height direction;
- a raising and lowering unit that is supported by the mast and that has a changeable height;
- a guide rail that extends forward from the raising and lowering unit;
- an arm that is supported by the guide rail and that is slidable in a front-rear direction;
- a cargo platform that is provided at a tip part of the arm and that holds the cryopump; and
- a counterweight that is provided on a rear side of the bogie.

2. The transport device according to claim 1,
wherein the arm is a multi-joint arm.

3. The transport device according to claim 2,
wherein the arm includes a sliding spacer that is provided between two arm members connected to each other by a joint.

4. The transport device according to claim 1,
wherein the cargo platform is pivotable with respect to the tip part of the arm.

5. The transport device according to claim 1,
wherein the cargo platform includes a locking portion that locks a fixing tool for fixing the cryopump to the cargo platform.

6. The transport device according to claim 1,
wherein the cargo platform has a substantially recessed shape for receiving a side surface of a substantially cylindrical vacuum chamber included in the cryopump.

7. The transport device according to claim 1, wherein the guide rail is disposable in front of the front wheel.

8. The transport device according to claim 1, further comprising:

an outrigger that is extendable from the bogie to a side.

9. A transport method of a cryopump using a transport device including a bogie that includes a front wheel and a rear wheel, a mast that extends from a front side of the bogie in a height direction, a raising and lowering unit that is supported by the mast and that has a changeable height, a guide rail that extends forward from the raising and lowering unit, an arm that is supported by the guide rail and that is slidable in a front-rear direction, a cargo platform that is provided at a tip part of the arm and that holds the cryopump, and a counterweight that is provided on a rear side of the bogie, the transport method comprising:

a process of causing the cargo platform to hold the cryopump;

a process of causing the bogie to travel;

a process of changing a height of the raising and lowering unit;

a process of sliding the arm; and a process of removing the cryopump from the cargo platform.

* * * * *